(12) United States Patent
Matsushita (10) Patent No.: US 12,055,184 B2
(45) Date of Patent: Aug. 6, 2024

(54) BEARING DEVICE FOR VEHICLE WHEEL

(71) Applicant: NTN Corporation, Osaka (JP)

(72) Inventor: Tomoki Matsushita, Shizuoka (JP)

(73) Assignee: NTN Corporation, Osaka (JP)

( * ) Notice: Subject to any disclaimer, the term of this patent is extended or adjusted under 35 U.S.C. 154(b) by 101 days.

(21) Appl. No.: 17/919,663

(22) PCT Filed: Apr. 20, 2021

(86) PCT No.: PCT/JP2021/016084
§ 371 (c)(1),
(2) Date: Oct. 18, 2022

(87) PCT Pub. No.: WO2021/220896
PCT Pub. Date: Nov. 4, 2021

(65) Prior Publication Data
US 2023/0160428 A1 May 25, 2023

(30) Foreign Application Priority Data

Apr. 30, 2020 (JP) ................. 2020-080439

(51) Int. Cl.
*F16C 19/38* (2006.01)
*F16C 33/36* (2006.01)
*F16C 33/58* (2006.01)

(52) U.S. Cl.
CPC .......... *F16C 33/583* (2013.01); *F16C 19/386* (2013.01); *F16C 33/366* (2013.01);
(Continued)

(58) Field of Classification Search
CPC .... F16C 19/385; F16C 19/386; F16C 33/366; F16C 33/583; F16C 33/585; F16C 2240/46; F16C 2240/70; F16C 2326/02
See application file for complete search history.

(56) References Cited

U.S. PATENT DOCUMENTS

2013/0322805 A1* 12/2013 Liang ............... F16C 33/64
384/619
2014/0126850 A1* 5/2014 Liang ............... F16C 19/364
29/898.068

(Continued)

FOREIGN PATENT DOCUMENTS

| CN | 1396392 A * | 2/2003 | ............ F16C 19/225 |
| JP | 54-089147 | 7/1979 | |

(Continued)

OTHER PUBLICATIONS

International Search Report issued Jul. 6, 2021, in International (PCT) Application No. PCT/JP2021/016084, with English translation.

*Primary Examiner* — Phillip A Johnson
(74) *Attorney, Agent, or Firm* — Wenderoth, Lind & Ponack, L.L.P.

(57) ABSTRACT

The present invention provides a bearing device for vehicle wheel reducing the occurrence of abnormal heat generation caused by metal contact and enhancing anti-seizing properties. Each of the tapered rollers 4 has a large diameter-side end surface 41, the inner raceway surface 31, and the large flange part 32. The large flange part 32 includes a chamfered part 32c and a rounded part 32d. The large flange part 32 has a large flange part-side cutout part 34, the large diameter-side end surface 41 of each of the tapered rollers 32 has a tapered roller-side cutout part 43 having a circular shape formed coaxially with the large diameter-side end surface 41, and a clearance of the large diameter-side end surface 41 as viewed from a contact point between the large diameter-side end surface 41 and the guide surface 32a is greater than or equal to 15 μm.

6 Claims, 5 Drawing Sheets

(52) U.S. Cl.
CPC ........ *F16C 33/585* (2013.01); *F16C 2240/46* (2013.01); *F16C 2240/70* (2013.01); *F16C 2326/02* (2013.01)

(56) References Cited

U.S. PATENT DOCUMENTS

| | | | |
|---|---|---|---|
| 2015/0093063 A1* | 4/2015 | Liang | F16C 33/585 384/564 |
| 2015/0167742 A1* | 6/2015 | Murata | F16C 19/364 384/565 |

FOREIGN PATENT DOCUMENTS

| | | | | |
|---|---|---|---|---|
| JP | 2000170775 A | * | 6/2000 | ............ F16C 19/225 |
| JP | 2011-163454 | | 8/2011 | |
| JP | 2011163454 A | * | 8/2011 | ............ F16C 19/225 |
| JP | 2019184018 A | * | 10/2019 | |

\* cited by examiner

BEARING DEVICE FOR VEHICLE WHEEL

TECHNICAL FIELD

The present invention relates to a bearing device for a vehicle wheel.

BACKGROUND ART

Conventionally, as a bearing device mainly used for rotatably supporting each wheel of a long-distance transport vehicle with a heavy body weight, such as a truck, a bus, or a pickup truck, a bearing device for a vehicle wheel including a multi-row tapered roller bearing is known.

In the bearing device for a vehicle wheel, for example, as disclosed in Patent Literature 1, a plurality of tapered rollers are rollably accommodated between a multi-row outer rolling surface (outer raceway surface) formed on an inner periphery of an outer member and a plurality of inner rolling surfaces (inner raceway surface) formed on an outer periphery of an inner member, and the inner raceway surface (or the outer raceway surface) has a large flange part integrally formed with the inner raceway surface, the large flange part having a guide surface with which a large end surface (large diameter-side end surface) of each of the tapered rollers formed in a convex shape is in sliding contact.

Further, in the large flange part, a chamfered part continuous with an outside surface (or a bore surface) of the large flange part, and a grinding cutout (large flange part-side cutout part) provided at a base of the large flange part are formed, and a rounded part having an arc shape in a cross-sectional view is formed in at least one of the chamfered part or the large flange part-side cutout part.

When the vehicle travels, lubricating oil enters a gap formed between the large diameter-side end surface of each of the tapered rollers and the guide surface of the large flange part through the rounded part to form an oil film due to a wedge effect, and the lubricating oil is easily drawn into a contact portion between the large diameter-side end surface and the guide surface to increase lubricating performance and durability.

CITATION LIST

Patent Literature

Patent Literature 1: JP-A 2011-163454 Gazette

SUMMARY OF INVENTION

Technical Problems

Meanwhile, an axial load applied to the bearing device for a vehicle wheel including such a multi-row tapered roller bearing is borne mainly between the large diameter-side end surface of each of the tapered rollers and the guide surface of the large flange part, and a contact ellipse with a tangential direction of a circular locus when the tapered roller rolls set as a major axis direction is formed at the contact portion between the large diameter-side end surface and the guide surface on the basis of Hertz elastic contact theory.

Therefore, the contact portion between the large diameter-side end surface of each of the tapered rollers and the guide surface of the large flange part is in rolling contact with each other with large slippage due to the structure of the bearing, so that wear easily occurs between the large diameter-side end and the guide surface.

In the bearing device for a vehicle wheel disclosed in Patent Literature 1, however, an allowable value of the amount of wear between the large diameter-side end of each of the tapered rollers and the guide surface of the large flange part is not specifically set in advance, so that there is a possibility that the gap between the large diameter-side end and the guide surface (clearance of the large diameter-side end as viewed from the guide surface) is not sufficiently secured and becomes minimal when a travel distance of the vehicle reaches a long distance of about 1 million km, for example.

As a result, it becomes difficult to sufficiently draw the lubricating oil into the contact portion between the large diameter-side end surface of each of the tapered rollers and the guide surface of the large flange part, and the oil film forming ability decreases due to a failure in producing the wedge effect, which may cause, for example, abnormal heat generation due to metal contact.

It is therefore an object of the present invention to provide a bearing device for a vehicle wheel for use in, for example, a long-distance transport vehicle with a heavy body weight, the bearing device for a vehicle wheel reducing the occurrence of, for example, abnormal heat generation caused by metal contact and enhancing anti-seizing properties.

Solutions to Problems

The problems to be solved by the present invention are as described above, and solutions to the problems will be described below.

Specifically, a bearing device for a vehicle wheel includes an outer member having a multi-row outer raceway surface on an inner periphery, an inner member having, on an outer periphery, a multi-row inner raceway surface facing the multi-row outer raceway surface, and a plurality of tapered rollers rollably accommodated between the outer raceway surface and the inner raceway surface, each of the tapered rollers having a large diameter-side end surface formed in a convex shape having a predetermined radius of curvature, the inner raceway surface having a large flange part integrally formed with the inner raceway surface, the large flange part having a guide surface having a conical surface shape, the guide surface being in point contact with the large diameter-side end surface in a slidable manner to guide each of the tapered rollers. The large flange part includes a chamfered part continuous with an outside surface of the large flange part, and a rounded part formed in an arc shape having a predetermined radius of curvature in a cross-sectional view, the rounded part being continuous with the chamfered part on one side and continuous with the guide surface on another side, the large flange part has a large flange part-side cutout part formed at a base of the large flange part, the large flange part-side cutout part being continuous with the guide surface, the large diameter-side end surface of each of the tapered rollers has a tapered roller-side cutout part having a circular shape formed coaxially with the large diameter-side end surface, and a clearance of the large diameter-side end surface as viewed from a contact point between the large diameter-side end surface and the guide surface in an unused initial state is greater than or equal to 15 μm.

Advantageous Effects of Invention

The effects of the present invention are as follows.

That is, with the bearing device for a vehicle wheel according to the present invention, it is possible to sufficiently secure the gap between the large diameter-side end surface of each of the tapered rollers and the guide surface of the large flange part to maintain the oil film forming ability due to the wedge effect, to reduce the occurrence of, for example, abnormal heat generation caused by metal contact, and to enhance anti-seizing properties.

DESCRIPTION OF EMBODIMENT

Next, an embodiment embodying a bearing device for a vehicle wheel according to the present invention will be described with reference to FIGS. 1 to 5.

Herein, for the sake of convenience, a direction parallel to a rotation axis G (see FIG. 1) of a bearing device for a vehicle wheel 1 is defined as an "axial direction", a direction orthogonal to the rotation axis G is defined as a "radial direction", and a direction along an arc centered on the rotation axis G is defined as a "circumferential direction".

Further, a side adjacent to the rotation axis G in the radial direction is defined as an "inner diameter side", and a side opposite from the inner diameter side in the radial direction is defined as an "outer diameter side".

[Overall Structure of Bearing Device for Vehicle Wheel 1]

First, an overall structure of the bearing device for a vehicle wheel 1 according to the present embodiment will be described with reference to FIGS. 1 and 2.

Figure 1:
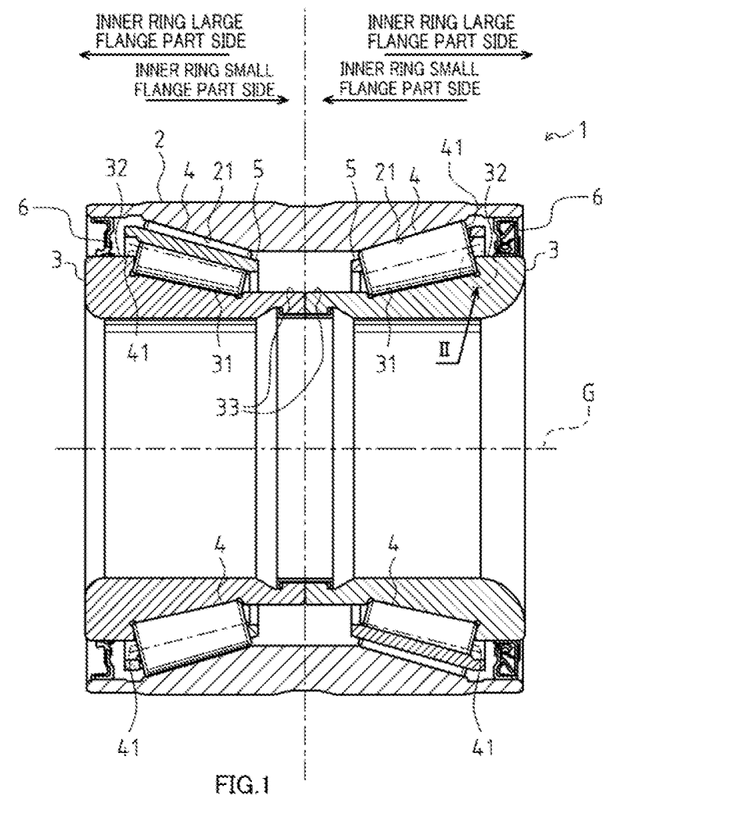
FIG. 1 is a cross-sectional view showing an overall structure of a bearing device for a vehicle wheel according to an embodiment of the present invention.

As shown in FIG. 1, the bearing device for a vehicle wheel 1 has a structure called the first generation, and primarily includes an outer ring 2 that is an example of an outer member and has, on an inner periphery, outer raceway surfaces 21, 21 of a multi-row type (double-row type in the present embodiment), a pair of inner rings 3, 3 that is an example of an inner member and has, on an outer periphery, inner raceway surfaces 31, 31 of a multi-row type (double-row type in the present embodiment) facing the outer raceway surfaces 21, 21, a plurality of tapered rollers 4, 4, . . . rollably accommodated between the outer raceway surfaces 21, 21 and the inner raceway surfaces 31, 31, a pair of cages 5, 5 that hold the plurality of tapered rollers 4, 4 . . . so as to make the plurality of tapered rollers 4, 4 . . . rollable, seals 6, 6 attached to both ends of the outer ring 2 in the axial direction, and the like.

In the outer ring 2, the pair of outer raceway surfaces 21, 21 is formed in a mortar shape whose a diameter increases from a center to both ends in the axial direction. Further, the inner raceway surface 31 of each inner ring 3 is formed in a conical shape whose diameter increases from a center to an end of the bearing device for a vehicle wheel 1 in the axial direction.

The pair of inner rings 3, 3 is disposed, on the inner diameter side of the outer ring 2, coaxially with the outer ring 2 with the pair of inner rings 3, 3 facing the outer ring 2, and the bearing device for a vehicle wheel 1 is structured as a multi-row tapered roller bearing of a back-to-back arrangement type.

In the inner ring 3, a large flange part 32 extending toward the outer diameter side is integrally formed at an end adjacent to a large diameter side of the inner raceway surface 31. Further, a small flange part 33 extending toward the outer diameter side and positioned on the inner diameter side relative to the large flange part 32 is integrally formed at an end on the small diameter side of the inner raceway surface 31.

Here, the "large diameter side" means an enlarged diameter side of the inner raceway surface 31. The "small diameter side" means a reduced diameter side of the inner raceway surface 31.

The plurality of tapered rollers 4, 4, . . . held by the cage 5 are disposed on the inner raceway surface 31.

As a result, each tapered roller 4 slidably comes into contact with the large flange part 32 to be guided to move in the radial direction and restricted from moving toward the large diameter side (that is, an inner ring large flange part side) in the axial direction by the large flange part 32.

Further, when slightly moving toward the small diameter side in the axial direction, each tapered roller 4 comes into contact with the small flange part 33 to be restricted from moving toward the small diameter side (that is, an inner ring small flange part side) in the axial direction by the small flange part 33.

The outer ring 2, the inner ring 3, and the tapered roller 4 are made of, for example, high-carbon chromium bearing steel such as SUJ2, and are hardened in a range of 58 to 64 HRC up to a core part by through hardening, but are not limited to such a material, and the outer ring 2, the inner ring 3, and the tapered roller 4 may be made of, for example, structural alloy steel such as SCr420, and their surfaces may be hardened in a range of 58 to 64 HRC by carburizing and quenching.

Further, the cage 5 is formed by, for example, injection molding an engineering plastic such as polyamide (PA) 66, a super engineering plastic such as polyphenylene sulfide (PPS), or a material containing, as a base, thermoplastic synthetic resin of such a plastic, and an appropriate amount of a reinforcing material such as glass fiber (GF).

Figure 2:
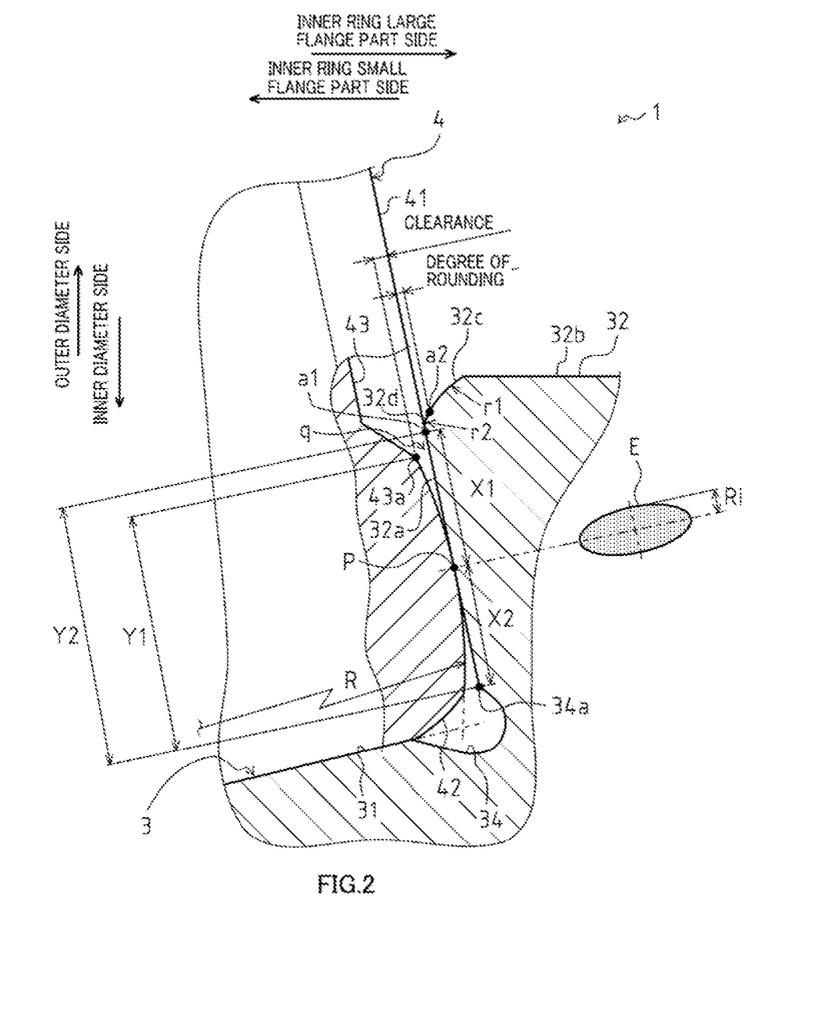
FIG. 2 is a diagram showing details of a contact portion between a large end surface of a tapered roller and a large flange part of an inner ring and is an enlarged cross-sectional view of a portion indicated by a region II in FIG. 1.

As shown in FIG. 2, a large diameter-side end surface 41 of the tapered roller 4 is formed in a convex shape having a predetermined radius of curvature R, and a chamfered part 42 is formed at a corner (peripheral part) on an outer peripheral side of the large diameter-side end surface 41.

Further, on an inner peripheral side of the large diameter-side end surface 41, a tapered roller-side cutout part 43 having a circular shape is formed coaxially with the large diameter-side end surface 41 by, for example, header processing.

The radius of curvature R of the large diameter-side end surface 41 is set within a range of 0.75 to 0.95 times a distance RO (not shown) from an apex of a conical surface that is the inner raceway surface 31 of the inner ring 3 to a contact point P between the large diameter-side end surface 41 of the tapered roller 4 and the large flange part 32 (more specifically, a guide surface 32a to be described later) of the inner ring 3 (R=0.75 to 0.95 RO).

Note that, in the present embodiment, as will be described later, the radius of curvature R of the large diameter-side end surface 41 is set so as to make a clearance between the large diameter-side end surface 41 and the guide surface 32a equal to a predetermined value.

On the other hand, the large flange part 32 of the inner ring 3 has the guide surface 32a having a conical surface shape for guiding the tapered roller 4, and each tapered roller 4 is disposed on the inner raceway surface 31 with the large diameter-side end surface 41 in point contact with the guide surface 32a in a slidable manner.

Further, a chamfered part 32c and a rounded part 32d are sequentially and continuously formed from an outside surface 32b to the guide surface 32a of the large flange part 32, and in a circumferential cross-sectional view, the chamfered part 32c is formed in a gently curved arc shape having a predetermined radius of curvature r1, and the rounded part 32d is formed in an arc shape having a predetermined radius of curvature r2 sufficiently smaller than the radius of curvature r1 of the chamfered part 32c.

In other words, the large flange part 32 of the inner ring 3 has the chamfered part 32c continuous with the outside surface 32b thereof (of the large flange part 32) and the rounded part 32d that is formed in an arc shape having the predetermined radius of curvature r2 in a cross-sectional view and is continuous with the chamfered part 32c on one side and continuous with the guide surface 32a on the other side.

Note that, in the present embodiment, as will be described later, the shape of the rounded part 32d is set so as to make the radius of curvature r2 and a degree of rounding equal to their respective predetermined values.

Further, a start point position of the rounded part 32d is set to a predetermined position.

Thein, with the tapered roller 4 installed in the inner ring 3, a start point of the tapered roller-side cutout part 43, that is, an outer peripheral end 43a is set at a position on the inner diameter side relative to the outside surface 32b of the large flange part 32.

Further, the outer peripheral end 43a of the tapered roller-side cutout part 43 is positioned in the vicinity of a boundary between the guide surface 32a and the rounded part 32d of the large flange part 32, and an annular space q that is a wedge-shaped gap opened toward the outside surface 32b in the circumferential cross-sectional view is formed between the large diameter-side end surface 41 of the tapered roller 4 and the guide surface 32a of the large flange part 32.

As a result, at a contact portion between the large diameter-side end surface 41 of the tapered roller 4 and the large flange part 32 of the inner ring 3, lubricating oil is drawn into the annular space q by a wedge effect, and an oil film is easily formed, which allows an increase in lubricating performance and an increase in durability of bearing device for a vehicle wheel 1.

Note that, in the present embodiment, as will be described later, the start point position of the tapered roller-side cutout part 43 is set to a predetermined position.

In the inner ring 3, a large flange part-side cutout part 34 continuous with the guide surface 32a is formed at a base of the large flange part 32, that is, a corner between the inner raceway surface 31 and the large flange part 32.

An edge 34a of the large flange part-side cutout part 34 adjacent to the guide surface 32a is set at a position on the outer diameter side relative to a corner between the large diameter-side end surface 41 and the chamfered part 42 of the tapered roller 4.

As a result, even when the large flange part 32 wears due to contact with the large diameter-side end surface 41 of the tapered roller 4, the corner of the tapered roller 4 is less prone to come into contact with the guide surface 32a, and it is thus possible to prevent formation of a harmful protrusion on the edge 34a of the large flange part-side cutout part 34.

Note that, at the base of the large flange part 32, a rounded part formed in an arc shape having a predetermined radius of curvature in a circumferential cross-sectional view, the rounded part circumscribing the guide surface 32a, may be separately provided from the edge 34a of the large flange part-side cutout part 34 toward the outer diameter side.

With such a structure, it is possible to prevent, with higher reliability, formation of a harmful protrusion on the edge 34a of the large flange part-side cutout part 34 due to wear in the large flange part 32.

The bearing device for a vehicle wheel 1 having the above-described structure is excellent in durability against high loads or impact loads, and is suitable mainly for use as a bearing that rotatably supports each wheel of a long-distance transport vehicle with a heavy body weight, such as a truck, a bus, or a pickup truck.

Meanwhile, in a conventional bearing device for a vehicle wheel including a multi-row tapered roller bearing, when the bearing device is used as a bearing of a long-distance transport vehicle, there is no problem under a condition where a travel distance of the vehicle is about several hundreds of thousands km, but when the travel distance reaches a long distance of, for example, about one million km, the degree of wear between the large diameter-side end surface 41 of the tapered roller 4 and the guide surface 32a of the large flange part 32 of the inner ring 3 increases, and there is a possibility that lubricating oil is not sufficiently drawn into the above-described annular space q that is a wedge-shaped gap.

As a result, at the contact portion (contact point P) between the large diameter-side end surface 41 of the tapered roller 4 and the guide surface 32a of the large flange part 32 of the inner ring 3, oil film forming ability decreases, which may cause, for example, abnormal heat generation due to metal contact. Therefore, there has been a high demand for improvement measures for sufficiently drawing lubricating oil into the annular space q even under a condition where the travel distance of the vehicle has reached a long distance of about 1 million km.

Further, a contact ellipse E based on Hertz elastic contact theory appears at the contact portion (contact point P) between the large diameter-side end surface 41 of the tapered roller 4 and the guide surface 32a of the large flange part 32 of the inner ring 3, and it is known that the contact ellipse E increases in size in response to an increase in axial load during the use of the bearing and becomes the maximum, for example, during maximum turning of the vehicle.

Therefore, in the conventional bearing device for a vehicle wheel including a multi-row tapered roller bearing, in order to reduce the occurrence of galling between the large diameter-side end surface 41 of the tapered roller 4 and the large flange part 32 of the inner ring 3, the shape of the rounded part 32d is set such that at least the contact ellipse E that has become the maximum does not ride up on the outside surface 32b of the large flange part 32, and a boundary between the guide surface 32a of the large flange part 32 and the rounded part 32d (the start point of the rounded part 32d to be described later, that is, an inner peripheral end a1 of the rounded part 32d adjacent to the guide surface 32a) is positioned in the vicinity of an outer edge of the contact ellipse E that has become the maximum.

As will be described later, however, in the bearing device for a vehicle wheel during rotation operation, the tapered roller 4 may be inclined and skewed in the circumferential direction relative to a rotation axis g (see FIG. 4A) thereof due to the influence of an oil film such as lubricating oil, and at this time, the contact ellipse E also changes in position in response to the skew of the tapered roller 4, so that it is not sufficient that only the influence of the contact ellipse E that has become the maximum is taken into account for the setting of the rounded part 32d.

As a result of intensive studies in view of such improvements to the conventional bearing device for a vehicle wheel, various improvements described below allows the bearing device for a vehicle wheel 1 according to the present embodiment to be implemented as a bearing device for a vehicle wheel that reduces the occurrence of, for example, abnormal heat generation caused by metal contact even when the bearing device is used in a long-distance transport vehicle having a heavy body weight and has better anti-seizing properties.

Note that, as described above, the bearing device for a vehicle wheel 1 according to the present embodiment is structured as a multi-row tapered roller bearing of a back-to-back arrangement type, but is not limited to such a bearing, and may be structured as a single-row tapered roller bearing.

Further, the bearing device for a vehicle wheel 1 according to the present embodiment has a structure called the first generation as described above, but is not limited to such a structure, and for example, the bearing device for a vehicle wheel 1 may have a structure called the second generation in which an outer ring has a flange or the third generation in which an inner raceway surface is directly formed on an outer periphery of a hub ring.

[Improvements of Bearing Device for Vehicle Wheel 1]

Next, improvements of the bearing device for a vehicle wheel 1 according to the present embodiment that have been made to the conventional bearing device for a vehicle wheel will be described with reference to FIGS. 2 to 5.

<Shape of Large Diameter-Side End Surface 41 of Tapered Roller 4>

In FIG. 2, the large diameter-side end surface 41 of the tapered roller 4 is formed in a convex shape having the predetermined radius of curvature R as described above, and is in point contact with the guide surface 32a of the large flange part 32 of the inner ring 3 at the contact point P.

Therefore, between the large diameter-side end surface 41 and the guide surface 32a and in the vicinity of the contact point P, the annular space q that is a wedge-shaped gap opened toward the outside surface 32b in the circumferential cross-sectional view is formed.

Here, the large diameter-side end surface 41 of the tapered roller 4 and the guide surface 32a of the large flange part 32 of the inner ring 3 are in sliding contact with each other and are thus prone to wear, as the total rotation count of the bearing device for a vehicle wheel 1 increases, the degree of wear between the large diameter-side end surface 41 and the guide surface 32a gradually increases, and the annular space q gradually decreases and finally disappears accordingly.

Figure 3A:
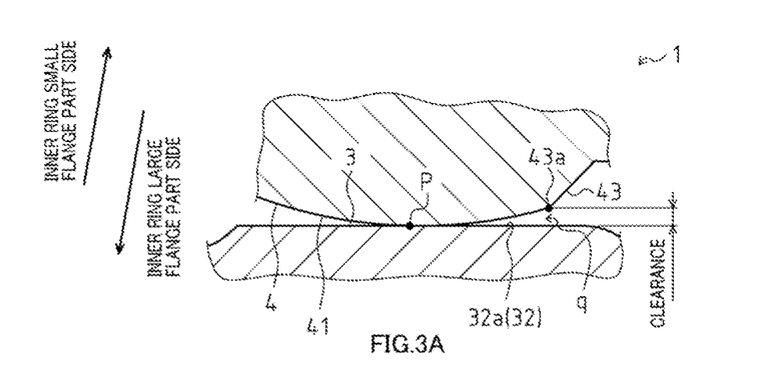
FIG. 3A is a diagram showing a degree of wear in the large end surface of the tapered roller over time and is an enlarged cross-sectional view of the large end surface of the tapered roller in an initial state where wear has not occurred yet.

Specifically, as shown in FIG. 3A, in a state where the bearing device for a vehicle wheel 1 has yet to be used or the total rotation count is relatively low, the large diameter-side end surface 41 of the tapered roller 4 and the guide surface 32a of the large flange part 32 of the inner ring 3 are in point contact with each other at a predetermined position (contact point P), and the annular space q located between the large diameter-side end surface 41 and the guide surface 32a has a sufficient gap having a predetermined shape set in advance.

As the total rotation count of the bearing device for a vehicle wheel 1 increases, the degree of wear between the large diameter-side end surface 41 of the tapered roller 4 and the guide surface 32a of the large flange part 32 of the inner ring 3 gradually increases, and the outer peripheral end 43a of the tapered roller-side cutout part 43 comes closer to the guide surface 32a accordingly.

Figure 3B:
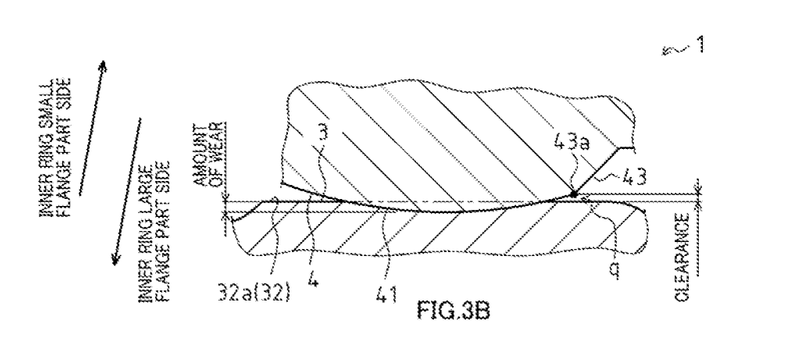
FIG. 3B is a diagram showing the degree of wear in the large end surface of the tapered roller over time and is an enlarged cross-sectional view of the large end surface of the tapered roller in a state where wear has occurred to a moderate degree relative to a predetermined wear limit.

As a result, the gap formed by the annular space q gradually decreases, and when the large diameter-side end surface 41 and/or the guide surface 32a has worn to a moderate degree as illustrated in FIG. 3B, for example, the gap formed by the annular space q becomes the minimum.

Figure 3C:
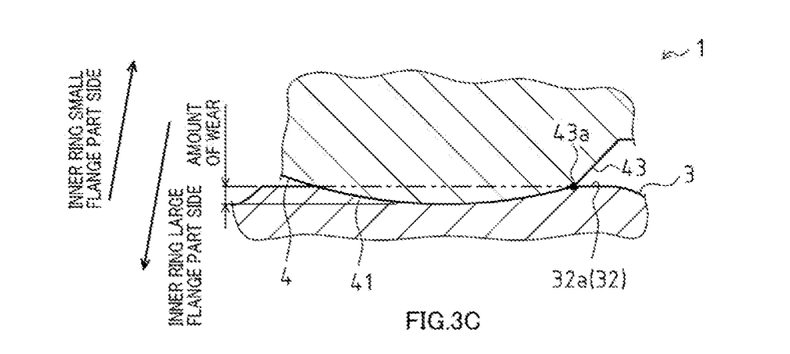
FIG. 3C is a diagram showing the degree of wear in the large end surface of the tapered roller over time and is an enlarged cross-sectional view of the large end surface of the tapered roller in a state where wear has occurred to the predetermined wear limit.

Then, when the total rotation count of the bearing device for a vehicle wheel 1 further increases and the degree of wear of the large diameter-side end surface 41 of the tapered roller 4 and/or the guide surface 32a of the large flange part 32 of the inner ring 3 reaches a preset limit as illustrated in FIG. 3C, for example, the outer peripheral end 43a of the tapered roller-side cutout part 43 reaches the guide surface 32a, and the annular space q disappears.

When the gap formed by the annular space q decreases to the minimum, it becomes difficult to sufficiently draw the lubricating oil due to the wedge effect, and the oil film forming ability at the contact portion (contact point P) between the large diameter-side end surface 41 of the tapered roller 4 and the guide surface 32a of the large flange part 32 of the inner ring 3 decreases accordingly.

As a result, as shown in FIG. 3B, for example, when the large diameter-side end surface 41 and/or the guide surface 32a has worn to a moderate degree and the gap formed by the annular space q becomes the minimum, a sufficient wedge effect cannot be produced any more, and it becomes difficult to form an oil film, which may cause, for example, abnormal heat generation due to metal contact. Further, the tapered roller 4 is easily skewed, and a degree of skew (skew amount) also increases, so that galling easily occurs between the large diameter-side end surface 41 and the large flange part 32.

Therefore, as will be described later, for example, even when the start point position of the rounded part 32d, that is, the position of the inner peripheral end a1 of the rounded part 32d adjacent to the guide surface 32a (see FIG. 2) is set with the state where the tapered roller 4 is skewed taken into account in advance in order to reduce the occurrence of galling between the large diameter-side end surface 41 of the tapered roller 4 and the large flange part 32 of the inner ring 3, the skew amount of the tapered roller 4 gradually increases as the degree of wear of the large diameter-side end surface 41 and/or the guide surface 32a increases, and thus galling is highly likely to occur at any point in time.

Accordingly, in order to reduce the occurrence of galling between the large diameter-side end surface 41 and the large flange part 32, it is important to set the shape of the gap formed by the annular space q, that is, the clearance between the large diameter-side end surface 41 and the guide surface 32a (more specifically, a size of a gap between the guide surface 32a and the outer peripheral end 43a of the tapered roller-side cutout part 43) with an amount of wear up to which the oil film forming ability can be kept high enough even when the degree of wear increases at the contact portion (contact point P) between the large diameter-side end surface 41 of the tapered roller 4 and the guide surface 32a of the large flange part 32 of the inner ring 3 taken into account in advance.

Meanwhile, a long-distance transport vehicle such as a truck tends to be longer in travel distance than a passenger vehicle, and may travel a long distance of, for example, about 1 million km, and even when used in such a long-distance transport vehicle, it is important to set the clearance to an optimum value in advance such that the oil film forming ability can be kept high enough.

For the conventional bearing device for a vehicle wheel, however, the above-described clearance is not sufficiently managed, and the optimum value of the clearance that allows the oil film forming ability to be kept high enough even when the travel distance reaches a long distance of about 1 million km is not clear, so that there has been an increasing demand for finding such an optimum value of the clearance in recent years.

Then, the present inventor has found, as a result of intensive studies, that it is possible to keep the oil film forming ability high enough even when the travel distance reaches a long distance of about 1 million km by setting in advance the clearance between the large diameter-side end surface 41 of the tapered roller 4 and the guide surface 32a of the large flange part 32 of the inner ring 3 greater than or equal to 15 μm.

As described above, in the bearing device for a vehicle wheel 1, it is apparent from the result of the studies based on the following examination results that the oil film forming ability can be kept high enough by setting in advance the clearance of the large diameter-side end surface 41 as viewed from the contact point P between the large diameter-side end surface 41 of the tapered roller 4 and the guide surface 32a of the large flange part 32 of the inner ring 3 greater than or equal to 15 μm.

That is, for a long-distance transport vehicle provided with a bearing device for a vehicle wheel including a multi-row tapered roller bearing, the amount of wear (unit: μm) in the large flange part 32 of the inner ring 3 and the clearance (unit: μm) of the large diameter-side end surface 41 of the tapered roller 4 at the time when the travel distance reaches 100,000 km, 250,000 km, 500,000 km, 1 million km, and 1.5 million km were examined, and the results shown in the following [Table 1] were obtained.

TABLE 1

| | Travel distance [ten thousand km] | | | | |
|---|---|---|---|---|---|
| | 10 | 25 | 50 | 100 | 150 |
| Amount of wear in large flange part of inner ring [μm] | 3 | 5 | 10 | 11 | 12 |
| Clearance of large diameter-side end surface of tapered roller [μm] | 12 | 10 | 5 | 4 | 3 |

As shown in Table 1, the amount of wear in the large flange part 32 of the inner ring 3 gradually increased as the travel distance of the long-distance transport vehicle increased up to about 500,000 km. Specifically, the amount of wear increased by 2 μm until the travel distance increased from 100,000 km to 250,000 km, whereas the amount of wear increased by 5 μm until the travel distance increased from 250,000 km to 500,000 km.

On the other hand, when the travel distance of the long-distance transport vehicle exceeded 500,000 km, a degree of increase in the amount of wear in the large flange part 32 of the inner ring 3 decreases regardless of the travel distance. Specifically, an increase in the amount of wear was 1 μm in both cases where the travel distance increased from 500,000 km to 1 million km and where the travel distance increased from 1 million km to 1.5 million km.

It is considered that the above-described results were obtained on the basis of the fact that when the travel distance of the long-distance transport vehicle reaches about 500,000 km, and the large diameter-side end surface 41 of the tapered roller 4 and/or the guide surface 32a of the large flange part 32 of the inner ring 3 wears to some degree, the large diameter-side end surface 41 and the guide surface 32a of the large flange part 32 are well-fitted to each other, and "stability" of the large diameter-side end surface 41 with respect to the guide surface 32a increases, so that an increase in the degree of wear is suppressed.

Accordingly, setting in advance the clearance greater than or equal to 15 μm prevents the gap formed by the annular space q from becoming the minimum as illustrated in FIG. 3B, for example, even when the travel distance of the long-distance transport vehicle provided with the bearing device for a vehicle wheel 1 exceeds 1 million km and allows the gap between the large diameter-side end surface 41 of the tapered roller 4 and the guide surface 32a of the large flange part 32 of the inner ring 3 to be kept large enough so as to maintain the oil film forming ability due to the wedge effect.

It is therefore possible to reduce the occurrence of, for example, abnormal heat generation caused by metal contact, enhance anti-seizing properties, suppress an increase in the skew amount of the tapered roller 4, and reduce the occurrence of galling between the large diameter-side end surface 41 of the tapered roller 4 and the large flange part 32 of the large flange part 32 of the inner ring 3.

<Radius of Curvature r2 and Degree of Rounding of Rounded Part 32d>

As described above, in the bearing device for a vehicle wheel 1 during rotation operation, the tapered roller 4 may be inclined and skewed in the circumferential direction relative to the rotation axis g thereof (see FIG. 4A) due to the influence of an oil film such as lubricating oil.

Figure 4A:
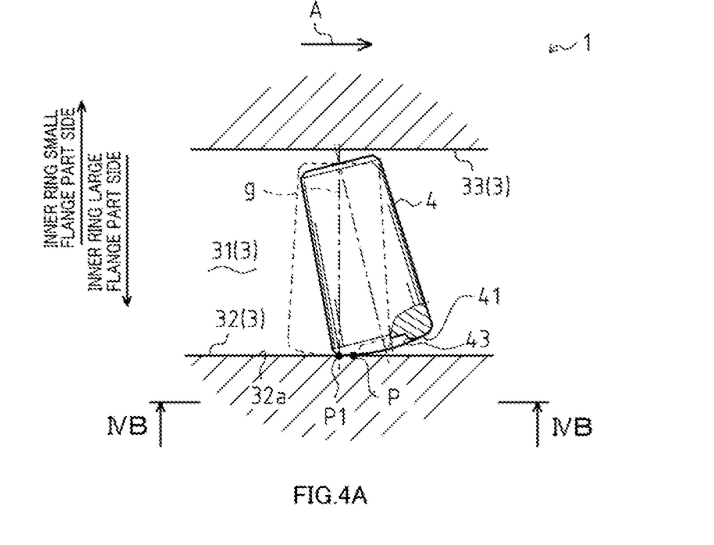
FIG. 4A is a diagram showing a relationship between the tapered roller and the inner ring in the bearing device for a vehicle wheel in operation and is a diagram schematically showing a state where the tapered roller is skewed as viewed from an outer diameter side in a radial direction.

Specifically, as shown in FIG. 4A, when the tapered roller 4 rolls in one direction (a direction of an arrow A in FIG. 4A. Hereinafter referred to as a "rolling direction A" as needed) relative to the inner ring 3, the tapered roller 4 is skewed so as to cause a moment produced by a thrust force received by the tapered roller 4 and a moment produced by an oil film reaction force to be balanced.

Figure 4B:
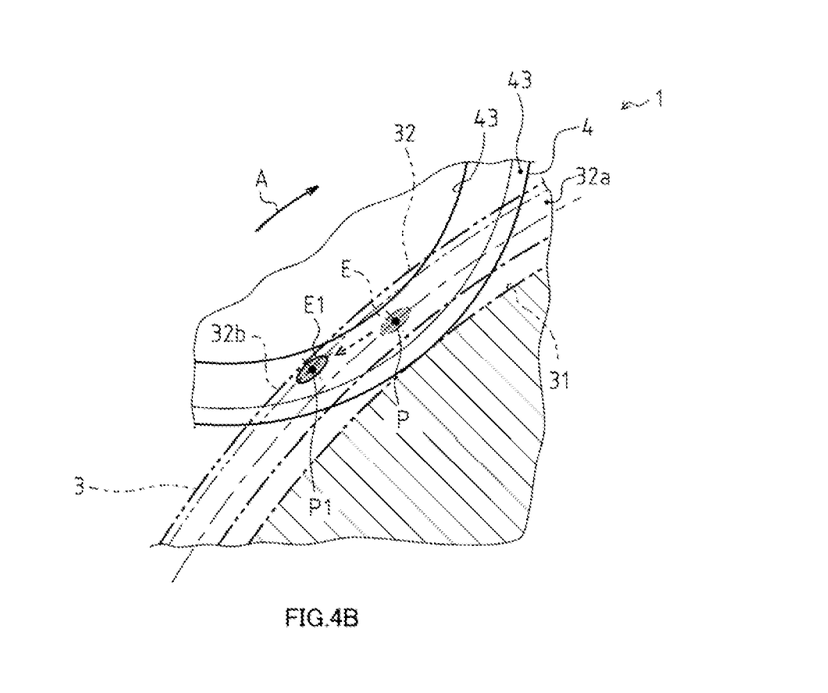
FIG. 4B is a diagram showing a relationship between the tapered roller and the inner ring in the bearing device for a vehicle wheel in operation and is a diagram schematically showing a state where a contact ellipse between the tapered roller and the large flange part of the inner ring moves in response to the skew as viewed in a direction of an arrow IV B in FIG. 4A.

As a result, the contact point P between the large diameter-side end surface 41 of the tapered roller 4 and the guide surface 32a of the large flange part 32 of the inner ring 3 moves in a direction opposite to the rolling direction A and is positioned in the vicinity of the outside surface 32b (a position of a contact point P1 in FIG. 4B) on the guide surface 32a of the large flange part 32 as illustrated in FIG. 4B.

When the position of the contact point P moves to the position of the contact point P1 due to the skew of the tapered roller 4, the position of the contact ellipse E appearing at the contact point P also moves.

Figure 5:
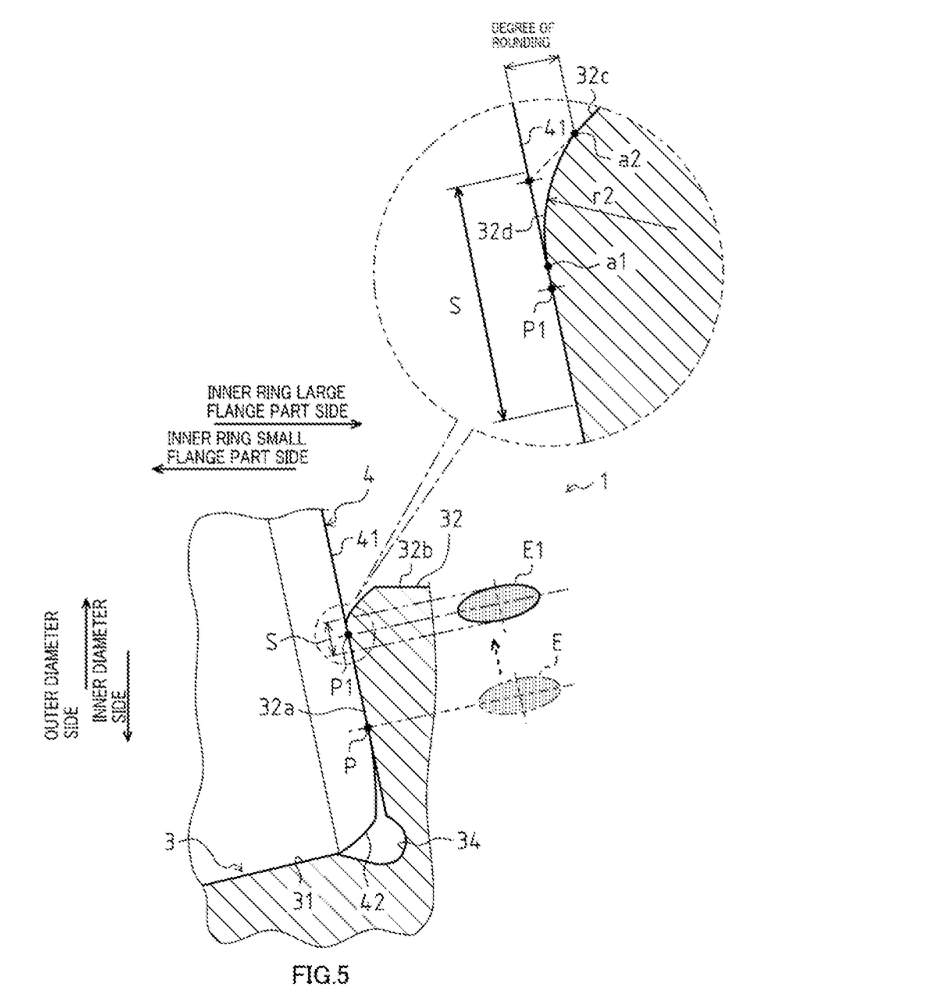
FIG. 5 is a diagram schematically showing a state where the contact ellipse between the tapered roller and the large flange part of the inner ring moves in response to the skew as viewed in a circumferential direction.

Specifically, as illustrated in FIG. 5, in the circumferential cross-sectional view, the contact ellipse E moves toward the outside surface 32b of the large flange part 32 of the inner ring 3 along with the movement of the contact point P, and appears at the position of the contact point P1 (the position of the contact ellipse E1 in FIG. 5).

Note that, in FIG. 5, a region indicated by an arrow S means a region where the contact ellipse E1 appears.

Therefore, in the bearing device for a vehicle wheel 1 according to the present embodiment, in order to reduce the occurrence of galling between the large diameter-side end surface 41 of the tapered roller 4 and the large flange part 32 of the inner ring 3, the rounded part 32d is formed to prevent at least the contact ellipse E1 that has become the maximum, that is, the contact ellipse E1 moved to the position of the contact point P1, from riding up on the outside surface 32b of the large flange part 32.

On the other hand, the degree of rounding of the rounded part 32d (a distance between the outer peripheral end a2 of the rounded part 32d adjacent to the chamfered part 32c and the large diameter-side end surface 41 of the tapered roller 4) is deeply related to the radius of curvature r2 of the rounded part 32d, and the larger the set value of the radius of curvature r2, the smaller the degree of rounding.

With the degree of rounding set too small, when the tapered roller 4 is skewed, the large diameter-side end surface 41 of the tapered roller 4 easily comes into contact with the rounded part 32d, which makes it difficult to reduce the occurrence of galling between the large diameter-side end surface 41 of the tapered roller 4 and the large flange part 32 of the inner ring 3.

It is therefore important to set the radius of curvature r2 of the rounded part 32d so as to obtain an appropriate degree of rounding.

Therefore, each degree of rounding (unit: μm) when the radius of curvature r2 of the rounded part 32d was set to 0.5 mm, 1.0 mm, 2.0 mm, and 5.0 mm was confirmed first, then the presence or absence of galling marks generated on the large diameter-side end surface 41 of the tapered roller 4 and/or the large flange part 32 of the inner ring 3 was confirmed after putting each bearing device for a vehicle wheel into rotation operation with the tapered roller 4 skewed, a quality verification test was conducted, and the results shown in the following [Table 2] were obtained.

Note that, for a quality determination, when no galling mark was observed, "Good" was entered, when a slight galling mark was observed but the quality was not significantly affected, "Acceptable" was entered, and when a galling mark affecting the quality was observed, "Poor" was entered.

TABLE 2

| | Radius of curvature r2 of rounded part [mm] | | | |
| --- | --- | --- | --- | --- |
| | 0.5 | 1.0 | 2.0 | 5.0 |
| Degree of rounding [μm] | 56 | 22 | 10 | 4 |
| Presence of galling mark | No | No | Slight contact mark is present | Yes |
| Quality determination | Good | Good | Acceptable | Poor |

As shown in Table 2, when the radius of curvature r2 of the rounded part 32d was set to 0.5 mm and 1.0 mm, their respective degrees of rounding were 56 μm and 22 μm, and no galling mark was observed on the large diameter-side end surface 41 of the tapered roller 4 and/or the large flange part 32 of the inner ring 3, so that the quality was determined to be "Good".

Further, when the radius of curvature r2 of the rounded part 32d was set to 2.0 mm, a corresponding degree of rounding was 10 μm, and a slight contact mark was observed on the large diameter-side end surface 41 of the tapered roller 4 and/or the large flange part 32 of the inner ring 3, but the quality was determined to be "Acceptable".

On the other hand, when the radius of curvature r2 of the rounded part 32d was set to 5.0 mm, a corresponding degree of rounding was 4 μm, and galling marks were observed on the large diameter-side end surface 41 of the tapered roller 4 and/or the large flange part 32 of the inner ring 3, so that the quality was determined to be "Poor".

From the above-described results, in the bearing device for a vehicle wheel 1 according to the present embodiment, the radius of curvature r2 of the rounded part 32d of the large flange part 32 of the inner ring 3 is set less than 2 mm, and the degree of rounding of the rounded part 32d is set greater than or equal to 10 μmm.

With such a structure, even with the tapered roller 4 skewed, it is possible to prevent, by the rounded part 32d, at least the contact ellipse E that has become the maximum from riding up on the outside surface 32b of the large flange part 32 with higher reliability, to reduce the occurrence of galling between the large diameter-side end 41 of the tapered roller 4 and the large flange part 32 of the inner ring 3, and to further enhance the anti-seizing properties against the occurrence of, for example, abnormal heat generation caused by the galling.

<Start Point Position of Rounded Part 32d of Large Flange Part 32 of Inner Ring 3>

As described above, in order to reduce the occurrence of galling between the large diameter-side end surface 41 of the tapered roller 4 and the large flange part 32 of the inner ring 3, it is necessary to set the position of the start point (inner peripheral end a1) of the rounded part 32d with the state where the tapered roller 4 is skewed taken into account in advance.

Specifically, it is necessary to set the position of the start point (inner peripheral end a1) of the rounded part 32d so as to prevent at least contact ellipse E1 that has become the maximum, that is, the contact ellipse E1 moved to the position of the contact point P1, from riding up on the outside surface 32b of the large flange part 32.

Here, as shown in FIG. 2, the contact ellipse E appearing at the contact point P between the large diameter-side end surface 41 of the tapered roller 4 and the guide surface 32a of the large flange part 32 of the inner ring 3 typically has an elliptical shape with a tangential direction of a circular locus (more specifically, a circular locus drawn by the contact point P) when the tapered roller 4 roll set as the major axis direction and a direction orthogonal to the major axis direction on the guide surface 32a set as the minor axis direction.

Further, the contact ellipse E1 (see FIG. 5) appearing at the contact point P1 that has moved toward the outside surface 32b of the large-diameter part 32 of the inner ring 3 is also considered to have an elliptical shape nearly the same as the contact ellipse E.

Therefore, as a result of intensive studies, although it is difficult to precisely estimate the position of the contact point P1, that is, the amount of movement of the contact point P, in advance because the position is complicatedly affected by the overall specifications or load conditions of the bearing device for a vehicle wheel 1, deformation of peripheral components, or the like, it has become clear that setting the position of the start point (inner peripheral end a1) of the rounded part 32d at a position separated by more than twice a minor axis radius Ri of the contact ellipse E when the maximum axial load is applied from the contact point P between the large diameter-side end surface 41 of the tapered roller 4 and the guide surface 32a of the large flange part 32 of the inner ring 3 makes it possible to sufficiently prevent the contact ellipse E1 from riding up on the outside surface 32b of the large flange part 32 even with the tapered roller 4 skewed.

Note that the position of the contact point P is desirably set at a position separated from the edge 34a of the large flange part-side cutout part 34 by more than the minor axis radius Ri of the contact ellipse E when the maximum axial load is applied so as to prevent the contact ellipse E from riding up on the large flange part-side cutout part 34 of the inner ring 3.

Accordingly, in the bearing device for a vehicle wheel 1 according to the present embodiment, assuming that Ri denotes the minor axis radius of the maximum contact ellipse E obtained by the point contact between the large-diameter-side end surface 41 of the tapered roller 4 and the guide surface 32a of the large flange part 32 of the inner ring 3 under the allowable maximum axial load, setting is made such that X1≥2×Ri is satisfied where X1 denotes the shortest length from the contact point P between the large diameter-side end surface 41 and the guide surface 32a to the boundary position between the rounded part 32d and the guide surface 32a (that is, the position of the inner peripheral end a1 that is the start point of the rounded part 32d), and X2>Ri is satisfied where X2 denotes the shortest length from the contact point P between the large diameter-side end surface 41 and the guide surface 32a to the boundary position between the large flange part-side cutout part 34 and the guide surface 32a (that is, the position of the edge 34a of the large flange part-side cutout part 34).

With such a structure, even with the tapered roller 4 skewed and the position of the contact ellipse E moved toward the outside surface 32b of the large flange part 32, for example, it is possible to prevent the contact ellipse E1 after the movement from riding up on the outside surface 32b of the large flange part 32, to reduce the occurrence of galling between the large diameter-side end 41 of the tapered roller 4 and the large flange part 32 of the inner ring 3, to reduce the occurrence of, for example, abnormal wear or abnormal heat generation caused by the galling, and to further enhance the anti-seizing properties.

Further, the contact ellipse E never rides up on the large flange part-side cutout part 34 regardless of the behavior of the tapered roller 4, so that it is possible to reduce the occurrence of galling between the large diameter-side end 41 of the tapered roller 4 and the large flange part 32 of the inner ring 3, to reduce the occurrence of, for example, abnormal wear or abnormal heat generation caused by the galling, and to further enhance the anti-seizing properties.

<Start Point Position of Tapered Roller-Side Cutout Part 43 of Tapered Roller 4>

As described above, with the tapered roller 4 installed in the inner ring 3, the start point of the tapered roller-side cutout part 43, that is, the outer peripheral end 43a, is set to be positioned on the inner diameter side relative to the outside surface 32b of the large flange part 32.

This is mainly intended to prevent stepped uneven wear from occurring on the large diameter-side end surface 41 of the tapered roller 4 as the degree of wear between the large diameter-side end surface 41 and the guide surface 32a of the large flange part 32 of the inner ring 3 gradually increases and the large diameter-side end surface 41 protrudes and comes into contact with the guide surface 32a.

However, when the start point (outer peripheral end 43a) of the tapered roller-side cutout part 43 is positioned on the outer diameter side relative to the start point (inner peripheral end a1) of the rounded part 32d, there is a possibility that the large diameter-side end surface 41 protrudes and comes into contact with the guide surface 32a due to an increase in the degree of wear, and it is thus difficult to sufficiently prevent the occurrence of stepped uneven wear on the large diameter-side end surface 41.

Therefore, in the bearing device for a vehicle wheel 1 according to the present embodiment, the start point of the tapered roller-side cutout part 43 of the tapered roller 4, that is, the outer peripheral end 43a (outer edge end), is set to be positioned adjacent to the large flange part-side cutout part 34 relative to the start point of the rounded part 32d of the large flange part 32 of the inner ring 3, that is, the inner peripheral end a1 that is the boundary position between the rounded part 32d and the guide surface 32a.

Specifically, when the shortest length from the edge 34a of the large flange part-side cutout part 34 to the outer peripheral end 43a of the tapered roller-side cutout part 43 is denoted as Y1, and the shortest length from the edge 34a of the large flange part-side cutout part 34 to the inner peripheral end a1 of the rounded part 32d is denoted as Y2, Y1<Y2 is always satisfied.

With such a structure, even when the degree of wear between the large diameter-side end surface 41 of the tapered roller 4 and the guide surface 32a of the large flange part 32 of the inner ring 3 increases, the contact portion between the large diameter-side end 41 and the guide surface 32a is always stably positioned on the guide surface 32a, and it is thus possible to reduce the occurrence of galling between the large diameter-side end surface 41 of the tapered roller 4 and the large flange part 32 due to the occurrence of stepped uneven wear on the large diameter-side end surface 41, to reduce the occurrence of galling marks or abnormal heat generation caused by the galling, and to further enhance the anti-seizing properties.

Although descriptions have been given above of the embodiment of the present invention, the present invention is in no way limited to the embodiment, and the embodiment is merely an example. It is needless to say that various other embodiments can be made without departing from the scope of the present invention, and the scope of the present invention is set forth in the claims and further contains meaning of equivalents set forth in the claims and all modifications within the scope.

INDUSTRIAL APPLICABILITY

The present invention is applicable to a bearing device for a vehicle wheel including a multi-row tapered roller bearing, which is mainly used as a bearing device for rotatably supporting each wheel of a long-distance transport vehicle with a heavy body weight, such as a truck, a bus, or a pickup truck.

REFERENCE SIGNS LIST 1 bearing device for vehicle wheel
2 outer ring (outer member)
3 inner ring (inner member)
4 tapered roller
21 outer raceway surface
31 inner raceway surface
32 large flange part
32a guide surface
32b outside surface of large flange part
32c chamfered part of large flange part
32d rounded part
34 large flange part-side cutout part
34a edge of large flange part-side cutout part (boundary position between large flange part-side cutout part and guide surface)
41 large diameter-side end surface
43 tapered roller-side cutout part
43a outer peripheral end (outer edge end) of tapered roller-side cutout part
a1 inner peripheral end of rounded part (boundary position between rounded part and guide surface)
E contact ellipse
P contact point between large diameter-side end surface and guide surface 32a
R radius of curvature of large diameter-side end surface
Ri minor axis radius of contact ellipse
r2 radius of curvature of rounded part

The invention claimed is:

1. A bearing device for a vehicle wheel comprising:
   an outer member having a multi-row outer raceway surface on an inner periphery;
   an inner member having, on an outer periphery, a multi-row inner raceway surface facing the multi-row outer raceway surface; and
   a plurality of tapered rollers rollably accommodated between the outer raceway surface and the inner raceway surface,
   each of the tapered rollers having a large diameter-side end surface formed in a convex shape having a predetermined radius of curvature,
   the inner raceway surface having a large flange part integrally formed with the inner raceway surface, the large flange part having a guide surface having a conical surface shape, the guide surface being in point contact with the large diameter-side end surface in a slidable manner to guide each of the tapered rollers,
   wherein the large flange part includes
   a chamfered part continuous with an outside surface of the large flange part, and
   a rounded part formed in an arc shape having a predetermined radius of curvature in a cross-sectional view, the rounded part being continuous with the chamfered part on one side in a radial direction and continuous with the guide surface on another side in the radial direction,
   the large flange part has a large flange part-side cutout part formed at a base of the large flange part, the large flange part-side cutout part being continuous with the guide surface,
   the large diameter-side end surface of each of the tapered rollers has a tapered roller-side cutout part having a circular shape formed coaxially with the large diameter-side end surface, and
   a clearance of the large diameter-side end surface as viewed from a contact point between the large diameter-side end surface and the guide surface is greater than or equal to 15 μm.

2. The bearing device for a vehicle wheel according to claim 1, wherein in the large flange part, the radius of curvature of the rounded part is less than 2 mm, and a degree of rounding of the rounded part is greater than or equal to 10 μmm.

3. The bearing device for a vehicle wheel according to claim 2, wherein
   under an allowable maximum axial load of the bearing device for a vehicle wheel,
   when a minor axis radius of a maximum contact ellipse obtained by the point contact between the large diameter-side end surface and the guide surface is denoted by Ri, and
   a shortest length from the contact point between the large diameter-side end surface and the guide surface to a boundary position between the rounded part and the guide surface is denoted as X1, X1≥2×Ri is satisfied, and
   when a shortest length from the contact point between the large diameter-side end surface and the guide surface to a boundary position between the large flange part-side cutout part and the guide surface is denoted as X2, X2>Ri is satisfied.

4. The bearing device for a vehicle wheel according to claim 1, wherein
   under an allowable maximum axial load of the bearing device for a vehicle wheel,
   when a minor axis radius of a maximum contact ellipse obtained by the point contact between the large diameter-side end surface and the guide surface is denoted by Ri, and
   a shortest length from the contact point between the large diameter-side end surface and the guide surface to a boundary position between the rounded part and the guide surface is denoted as X1, X1≥2×Ri is satisfied, and
   when a shortest length from the contact point between the large diameter-side end surface and the guide surface to a boundary position between the large flange part-side cutout part and the guide surface is denoted as X2, X2>Ri is satisfied.

5. The bearing device for a vehicle wheel according to claim 1, wherein an outer edge end of the tapered roller-side cutout part is positioned adjacent to the large flange part-side cutout part relative to a boundary position between the rounded part and the guide surface.

6. The bearing device for a vehicle wheel according to claim 1, being a bearing that supports each wheel of a long-distance transport vehicle.

* * * * *